(12) United States Patent
Kadambi et al.

(10) Patent No.: US 7,054,977 B2
(45) Date of Patent: May 30, 2006

(54) METHOD OF HANDLING DATA IN A NETWORK DEVICE

(75) Inventors: Shiri Kadambi, Los Altos Hill, CA (US); Shekhar Ambe, San Jose, CA (US); Sandeep Relan, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/176,353

(22) Filed: Jul. 8, 2005

(65) Prior Publication Data

US 2005/0268017 A1    Dec. 1, 2005

Related U.S. Application Data

(62) Division of application No. 10/079,576, filed on Feb. 22, 2002, now Pat. No. 6,934,787.

(51) Int. Cl.
*G06F 13/00* (2006.01)
*G06F 12/46* (2006.01)

(52) U.S. Cl. .......................... 710/303; 710/104
(58) Field of Classification Search .............. 710/1, 710/104, 105, 300–304, 100, 62, 72; 709/227, 709/249, 223, 236, 208; 370/400, 402, 902, 370/907, 813, 913; 398/118, 140, 58; 455/550.1; 715/111
See application file for complete search history.

(56) References Cited

U.S. PATENT DOCUMENTS

| | | | |
|---|---|---|---|
| 5,488,572 A | | 1/1996 | Belmont ................. 710/62 |
| 5,687,734 A | * | 11/1997 | Dempsey et al. .......... 600/509 |
| 5,706,488 A | * | 1/1998 | Gallup et al. ............. 712/223 |
| 5,802,052 A | | 9/1998 | Venkataraman |
| 5,805,416 A | * | 9/1998 | Friend et al. ............. 361/686 |
| 5,825,772 A | | 10/1998 | Dobbins et al. |
| 5,845,081 A | | 12/1998 | Rangarajan et al. |
| 5,864,708 A | | 1/1999 | Croft et al. ................. 710/1 |
| 5,887,187 A | | 3/1999 | Rostoker et al. |
| 5,930,257 A | | 7/1999 | Smith et al. |
| 5,987,507 A | | 11/1999 | Creedon et al. |
| 6,006,261 A | | 12/1999 | Ratcliff et al. |

(Continued)

FOREIGN PATENT DOCUMENTS

EP    809174    11/1997

(Continued)

OTHER PUBLICATIONS

"Wireless video coding system demonstration" by Villasenor et al. (abstract only) Publication Date: Mar. 28-30, 1995.*

(Continued)

*Primary Examiner*—Gopal C. Ray
(74) *Attorney, Agent, or Firm*—Squire, Sanders & Dempsey LLP

(57) ABSTRACT

A network device for handling data and a method for handling data in a network device are disclosed. The network device includes at least one media port and at least one high speed docking station, communicating with the at least one media port. At least one master is provided in the network device, where the at least one master is connected to the at least one high speed docking station. The master is configured to handle and process data received by the at least one media port and passed to the master through the at least one high speed docking station. The network device is configured to handle media ports of different media types. Thus, the device can handle data received through different media ports that have different media types with the same master, making the network device easily configured to meet a customer's needs.

13 Claims, 2 Drawing Sheets

U.S. PATENT DOCUMENTS

| | | | |
|---|---|---|---|
| 6,094,642 A * | 7/2000 | Stephenson et al. | 705/28 |
| 6,161,157 A * | 12/2000 | Tripathi et al. | 710/109 |
| 6,178,474 B1 | 1/2001 | Hamano et al. | 710/303 |
| 6,290,517 B1 | 9/2001 | Anderson | 439/131 |
| 6,442,639 B1 * | 8/2002 | McElhattan et al. | 710/303 |
| 6,483,906 B1 * | 11/2002 | Iggulden et al. | 379/102.03 |
| 6,678,535 B1 * | 1/2004 | Narayanaswami | 455/557 |
| 6,696,922 B1 * | 2/2004 | Wong et al. | 340/7.32 |
| 6,725,310 B1 | 4/2004 | Shoobe et al. | 710/303 |
| 6,767,253 B1 | 7/2004 | Werner et al. | 439/638 |
| 6,934,787 B1 * | 8/2005 | Kadambi et al. | 710/303 |
| 2003/0163625 A1 * | 8/2003 | Kadambi et al. | 710/303 |
| 2003/0233471 A1 * | 12/2003 | Mitchell et al. | 709/238 |
| 2005/0268017 A1 * | 12/2005 | Kadambi et al | 710/303 |

FOREIGN PATENT DOCUMENTS

| | | |
|---|---|---|
| EP | 849917 | 6/1998 |
| WO | 98/09473 | 3/1998 |
| WO | 99/00936 | 1/1999 |
| WO | 99/00945 | 1/1999 |
| WO | 99/00948 | 1/1999 |

OTHER PUBLICATIONS

Aweya, James, "On the Design of IP Routers Part 1: Router Architectures," Journal of Systems Architecture, Elsevier Science Publishers B. V., Amsterdam, Netherlands, vol. 46, No. 6, Apr. 2000.

"Object model creation from multiple range images: acquisition, calibration, model building and verification" by Beraldin, J.A. et al, (abstract only) Publication Date: May 12-15, 1997.

"Experimental study of airflow and particle characteristics of a 300-mm POUP/LPU minienvironment system" by Shih-Change et al, (abstract only), Publication Date: Nov. 2003.

* cited by examiner

METHOD OF HANDLING DATA IN A NETWORK DEVICE

CROSS REFERENCE TO RELATED APPLICATIONS

This is a Division of application Ser. No. 10/079,576 filed Feb. 22, 2002. The disclosure of the prior application(s) is hereby incorporated by reference herein in its entirety.

BACKGROUND OF THE INVENTION

1. Field of the Invention

The present invention relates to a new switch architecture that is independent of the type of media, where the media is the physical connections and protocols that allow data to be received and processed. More specifically, the architecture allows for a switch configuration to be adapted to the needs of the switching environment, especially if the switching environment is directed to mixed types of media.

2. Description of Related Art

A switch is defined as a network component that receives incoming data, stores the data temporarily, and sends the incoming data (either untouched or maybe after some modifications) to another port. The switching is accomplished by determining a destination address from the incoming data and sending the data to a port or multiple ports associated with the destination address. The use of switches is essential in handling the flow of data in high speed networks.

A switch for networking applications is generally dedicated to handle a particular Media type and Networking technology. The Architecture of such switch, being closely coupled to a Media type, is often difficult to adapt to future Media types and emerging packet switching technologies. As an example, the carrier-sense multiple access with collision detection (CSMA/CD) Ethernet networking switches have their architecture based on Std 802.3 defined Media Access Controllers (MAC) and Physical layer (PHY) subsystem as their building blocks. The current Std 802.3 based Ethernet switches are tightly integrated with the MAC layer and to some extent depend upon the PHY for link status. The current network switches would need to be re-designed to adapt to other networking technologies or different media interfaces.

In addition, because current switch architectures are media-centric, i.e. centered on the type of media for which they switch data, this aspect often limits the structure of the switches. Thus, a switch developed to provide switching of Ethernet packets may not be able to switch data that a cable set type box would receive and both switches could be configured quite differently because of the media types that they handle. Because of this, the media type determines the switch architecture to a large degree. Many times, the sections of the switch that determine the MAC, address resolution and content aware filtering logic are integrated in one Block to provide std. 802.3 compliant Ethernet Switching.

The architectures associated with specific media types do have the advantages of being highly integrated and highly optimized as a Single Chip solution for that media type. They do, however, have several limitations in terms of flexibility. Specifically, they only support one Media type (for example: std. 802.3, Ethernet-II switching and routing), and they require special external chips or converter logic to interface to other Media types like Wireless, ADSL/VDSL, Sonet etc, and many times they require new Silicon implementations to support higher or lower port density.

The prior art switches also prevent a provider of the switches from meeting the specific needs of the users of those switches. As an example, consider a specific switch on a chip that provides for 34 fast Ethernet ports and 2 Gigabit ports. One customer for that chip may want to have 40 fast Ethernet ports, another may want to have the capacity of 4 Gig ports and a third may wish to have just 24 fast Ethernet ports. Because the chip architecture is predetermined, the first customer would need two of the specific chips so configured to meet their requirements. The second customer would also require two specific switches to meet the need for 4 Gig ports, while the third would only require a single switch, but the chip would be under-utilized. In each case, the customer must purchase capacity for which it doesn't need and it makes it more difficult for a producer to meet the specific demands of the consumer. In addition, as discussed above, if the customers want to use the switches using "mixed media types," or allow for future use with new media types, they cannot use the purchased switches in those capacities. As an example, consider a customer who has 802.11 based LAN network, Std 802.3 based LAN Network, Home appliance Network based on some industry standard. If the customer wants to switch traffic between these three different Media types, the current architectures require bridging between all the three LAN networks using different set of ASIC solutions.

Thus there is a need to a switch architecture that allows for the number and type of ports to be customized without underutilizing the processing abilities of the switch. Additionally, there is also a need for a switch architecture that allows for expandability and continued customization after the sale of the initial switch configuration.

SUMMARY OF THE INVENTION

It is an object of this invention to overcome the drawbacks of the above-described conventional network devices and methods. In this disclosure, a new architecture for the next generations of switch independent of the front-end PHY and MAC layers is disclosed. The present invention provides a complete flexible and highly integrated solution by having all address resolution and filtering logic in a centralized place. The present invention can be based in silicon and could be configured on a single chip (cost optimization) or can be based on a chip-set (provides maximum flexibility) for system level implementation.

According to one aspect of this invention, a network device for handling data is disclosed. The network device includes at least one media port and at least one high speed docking station communicating with the at least one media port. At least one master is connected to the at least one high speed docking station, where the at least one master is configured to handle and process data received by the at least one media port and passed to the at least one master through the at least one high speed docking station. The network device is configured to handle media ports of different media types.

Additionally, the network device can be configured to handle media ports of different media types utilizing the same high speed docking station or utilizing different high speed docking stations. The at least one media port can also tag incoming data with tags that can be used by the at least one master to categorize the data. These tags provide information on a source port and a destination port for the received data and a media type ID for the at least one media port.

In the network device, the master can also communicate with a dedicated CPU to process received data. The at least one master can include a service agent for each media port and the service agent can have associated memory and logic blocks. The service agents act to pack, un-pack and buffer data received from the at least one high speed docking station.

Also, the network device can also have at least one high speed docking station that does not create any back-pressure for incoming data from the at least one media port. This can be accomplished wherein each media port of the network device has a maximum bandwidth and the at least one high speed docking station has a bandwidth that is greater than a sum of each maximum bandwidth of each media port of the network device.

Additionally, the at least one media port includes at least one port and at least one packet lane communicating between the at least one port and the at least one high speed docking station. This at least one packet lane can be a point to point bus providing a direct connection between the at least one port and the at least one high speed docking station. Alternatively, this at least one packet lane can be a shared bus, wherein a shared bus protocol mediates the flow of data between the at least one port and the at least one high speed docking station.

The network device can handle many media types according to IEEE 802.3 specifications, IEEE 802.11 specifications, a wireless communication specification which supports data, voice and content-centric applications, IEEE 1394 specifications, communication specifications for cable modems, Synchronous Optical Network specifications and specifications for a switched based serial I/O interconnect architecture built for fault tolerance and scalability.

The network device can include at least two masters and at least two high speed docking stations, where the masters are connected through a first high speed docking station and at least one of the masters is connected to the at least one media port through a second two high speed docking station.

In another aspect of the invention, a method of handling data in a network device is disclosed. Incoming data is received at a media port and then forwarded to a high speed docking station. The data is packed and passed to a master, where at least a portion of the packed data is processed. The data is forwarded to another media port based on the processed contents of the at least a portion of data. A first media type of the media port is either the same or different from a second media type of the another media port.

The invention is also embodied in a method of handling data in a network device. Incoming data is received at a media port and then forwarded to a high speed docking station. The data is packed and passed to a master, where at least a portion of the packed data is processed. The data is forwarded to another media port based on the processed contents of the at least a portion of data. A first media type of the media port is either the same or different from a second media type of the another media port.

In addition, the method can include forwarding the data to a second high speed docking station communicating with the another media port. The forwarding step can also include passing through a second master and other high speed docking station to reach the destination media port for the data.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

The present invention is directed to a switch having a centralized "Master" with detachable wings of "Media Ports" as the building blocks of the switch. The switch of the present invention is capable of having "n" ports of packet switching with per port processing engine centralized in a Master. The media interface for "n" ports (which can be of same or even mix of different media types) are organized as rooms in a wing of a building block type of configuration. These wings or "Docking Stations" dock to this master through a standard high speed interface bus. This interface bus should have aggregated bandwidth in excess of sum total of maximum bandwidth required by each wing. This is illustrated in FIG. 1.

Figure 1:
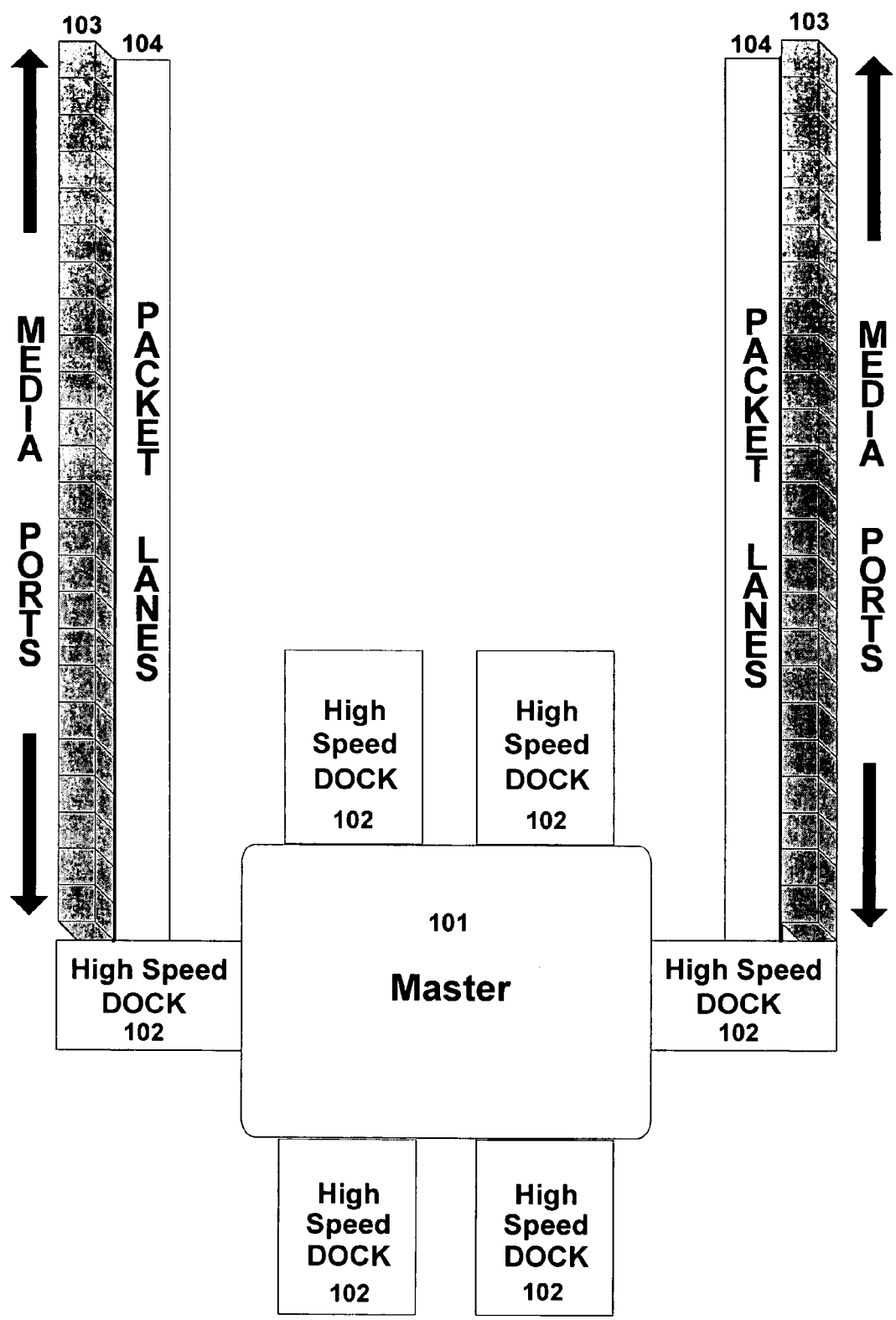
FIG. 1 is a schematic diagram showing a configuration of the network switch having a single master and multiple dock stations.

FIG. 1 is a schematic diagram of one embodiment of the present invention. The switch architecture independent of media of the present invention has three main building blocks: 1. The Master 101; 2. Dock(s) 102; and 3. Media Ports 103. Each are discussed in detail below.

The master 101 is the main "Administrator" that handles and processes all the data, preferably in the form of packets, received and finally switches the packet data to the appropriate port. The Master 101 is configurable through a dedicated CPU, memory engine and other logic to interact with user software. To achieve high performance switching, the Master has the support of "n" Service Agents, which are dedicated per Media port 103, i.e. one each for "n" number of Media port, or could be one Service Agent for multiple Media ports. This decision depends on the peak bandwidth of each Media port and the maximum bandwidth handling capability of a Service Agent.

The Docking Station 102 is basically like a "Transit Hall" between the Master and the Media Ports with zero waiting and loss-less byte Transfer. That is to say, that Docking Station does not block or create any Back-Pressure for incoming Bytes from Media Ports. And the Docking Station does not introduce any clock gaps in the Byte stream between Media Ports and master. The Docking Station acts as a facilitator and will simply keep pushing the Bytes from one end to another with appropriate tag bits to identify the start or end of valid Byte streams. The actual Packet formation will be performed by the Master or by the Media Port at their respective ends.

This Docking Station must have excess bandwidth such that the total is greater than the sum of all of the Media Ports maximum bandwidth. The excess bandwidth is needed to account for the overhead of extra bytes of tag insertion and processing actions performed by it.

The Media Port block consists of a collection of a number of PHY-MAC pairs integrated into a single package with the High Speed Docking Station interface. The Architecture of this block is very simple and straightforward as following steps:

1. Each media port forwards the incoming packet stream into its dedicated OUT-Packet Lane;
2. The Packet Lanes transfer data streams between Media ports and the Docking interface;
3. Incoming data-stream from Master is Split into Packets onto respective IN-Packet Lanes; and
4. Each Media port receiving packets on its IN-Packet Lanes send it out to the external world.

The Packet Lane 104 is the passage or a conduit to transfer the information as Packets or as Bytes between individual Media ports and the Docking station. The Packet Lane, in general, will not modify any of the information being transported by it, unless specifically required by an implementation.

The Packet lane can be implemented as a shared Bus or as a point to point full (or half) duplex bus between a Media port and the Docking station. The exact implementation depends on the bandwidth, latency and other factors as per the specific implementation requirements.

Implementation examples include point to point and shared bus examples. For point to point, the MAC of each Media port is directly connected to the Docking Station and the Docking Station takes care of steering the packets between the Master and the respective MAC of the Media Port. In a shared bus, a high speed shared bus interconnects all Media ports and the Docking Station. The shared bus protocol takes care of steering the packets or bytes between with the Media Port and the Docking Station.

While overall guidelines supplied herein are used to provide the components of the switch, the exact details are user selectable based on cost, number and type of media ports and performance requirements.

The Master is controlled by a CPU and configures its Service Agents. The Service Agents have a certain amount of dedicated Memory pool to handle incoming traffic. The Service Agents provide host of functions including packing and un-packing, incoming and outgoing packet buffering, memory management for packet storage, rules and table lookups, packet processing as per specified operations, packet forwarding and switching to other Media port Service Agent or even to CPU and packet statistics collection. In the packing function, the bytes collected from the High Speed Docking Station interface are packed into valid Packet boundary by the respective Service Agent.

For the un-packing process the packets being sent by the Master to Media ports through the High Speed Dock interface are un-packed into Bytes by the respective Service Agents.

The Docking Station has a Communication channel (a high speed link pipe) having bandwidth in excess of the sum total of all the Media ports maximum bandwidth. The excess bandwidth is needed to compensate for the overhead of actions performed by it, including tagging, packing and splitting. In tagging, extra bits are added to Byte flows to indicate valid Byte boundaries. In packing, Bytes are serialized from the Media Ports (on Packet lanes) into this high speed link pipe. The splitting action is performed by de-serializing the bit stream from the high-speed link pipe into Bytes to be sent to respective destination Media ports or Master Service Agents.

For example, for a 48 port 100 Mbit+4 port 1 Gigbit integrated Media Module (total aggregate Bandwidth: 17.6 Gig Bits/sec), a Docking Station employing a 10-Gigabit XGMII Mac (maximum bandwidth supported: 20.0 Gig Bits/sec) is integrated within both Master and Media DOCK ends. The Media Ports interface to the Docking Station on dedicated Byte Lanes from each Media Port. The Docking Station at Media Port end continuously multiplex the Byte Lanes onto its XGMII in a round robin fashion. The Docking Station at the Master Module end will receive these Bytes on its end of XGMII interface in a Round Robin way. Similarly, Bytes from Master module will be transferred to the Media Port.

A Tagging technique, depending upon the implementation requirements, is defined to indicate valid Byte and Source and Destination Media port ID. Depending upon the High Speed link interface used for the Docking Station, the incoming Bytes from the Media ports will be packed into a "Cell Format" (CF). This format (CF) is an implementation requirement specific standard across any Media Type and will provide basic set of information on the Source Media Port ID, the Media Type ID, the Length of Valid Data Bytes and other fields, as needed. The additional fields can contain CRC or checksum and other information if there is availability of excess Bandwidth.

The Media port block is a collection of "n" ports, consisting of any combination of the following logic blocks integrated in it: PHY, MAC and Packet or Information Processing Logic. The value "n" is dependent more on the silicon implementation of the Master in terms of capability of the Master to provide "n" Service agents and corresponding Memory and logic blocks. It also depends on the fact that the maximum bandwidth supported by Docking station must be greater than aggregate bandwidth of "n" media port blocks.

The Media port block can contain Ports of different Media types. Some examples of these types are:

IEEE 802.3 based 10/100/1000/10G and future specifications;

IEEE 802.11 based Wireless Media;

BLUETOOTH, a wireless communication specification which supports data, voice and content-centric applications, and other wireless media;

Firewire (IEEE 1394) for Audio and Video media;

Cable Modem;

Synchronous Optical Network, SONET (OC-48/OC-192/OC-768 and future specifications); and INFINIBAND, a switched based serial I/O interconnect architecture built for fault tolerance and scalability.

The above list should not be seen as limiting and any other Bus or any Networking media or any Channel providing any information (data or multimedia) can be used in the media ports. Each of the Ports in the Media port block can either Transmit or Receive information as Packets or Bytes via the Packet Lanes.

Figure 2:
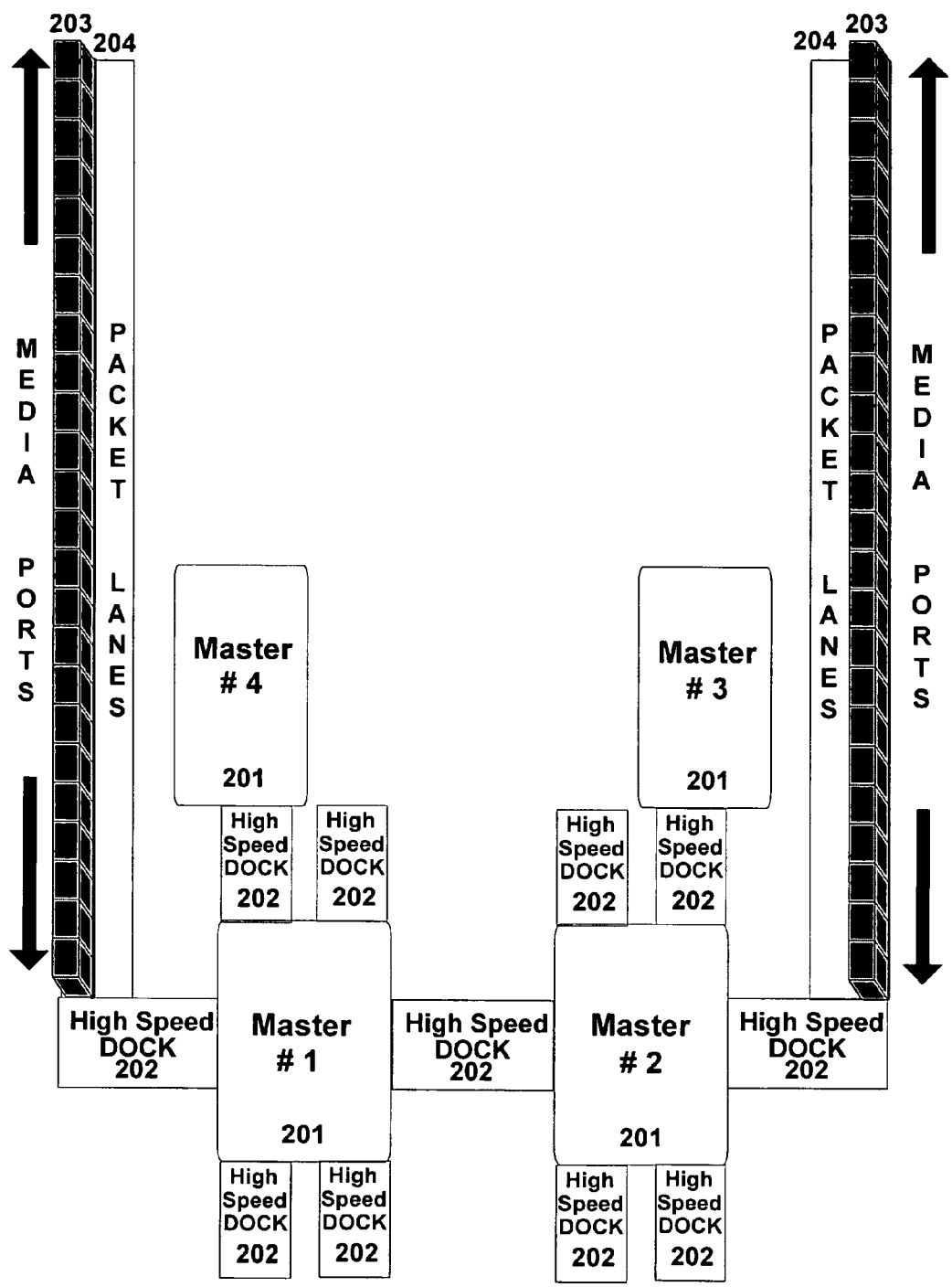
FIG. 2 is a schematic diagram illustrating a configuration of the network switch having multiple masters and multiple dock stations.

The architecture of the present invention provides an innovative solution for multiple applications, thereby achieving the following goals. The architecture is universal and has a broad application range from Multimedia, Networking, Storage. The architecture is also unique and allows for a fast time to market. The architecture is easy to adapt to any new MAC/PHY technology. The architecture is also scalable such that multi master stacks can provide bigger configuration solutions. Such an embodiment is illustrated in FIG. 2, with multiple Masters 201 connected to Media Ports 203 through high speed Docking Station 202 through Packet Lanes 204.

The architecture of the present invention is also cost effective in that the same Master core is usable across multiple solutions, i.e. has a large volume potential. Additionally, the architecture is flexible and provides for solutions for wide range of markets and with a large mix of media (Wireless, cable, ADSL, etc.).

The present invention has the benefit that it is not media centric and can be adapted to be used with different types of media. This makes the process of configuring the switch to meet a customer's needs simple and improves the marketability of the switch. The present invention also prevents backups at the ports because the media ports provide no real processing; they simply pass data to the master. In the prior art architecture, the delays at each port add up and contribute to backups of packets at the ports. These delays are eliminated, as discussed above, because the master has a throughput that is greater than all of the ports collectively.

Another benefit of the present invention is that data can be distributed over different media. Thus, a given fast Ethernet port can be mirrored on a port that is not a fast Ethernet port. Also, ports of different media types can be trunked together to provide great capacity. The present invention also decreases the need to stack switches to meet requirements while still allowing for the stacking of switches using a media type that may be best suited to the application.

The above-discussed configuration of the invention is, in one embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and components, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

It is noted that while the present invention cites, as examples, a switch for processing packet data, the present invention is not limited to policy-based frame processing and classification. Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method of handling data in a network device, said method comprising:
   receiving incoming data at a media port;
   forwarding said data to a high speed docking station;
   packing said data;
   passing said packed data to a master;
   processing at least a portion of said packed data by said master; and
   forwarding said data to another media port based on the processed contents of said at least a portion of data;
   wherein a first media type of said media port is the same or different from a second media type of said another media port.

2. A method of handling data as recited in claim 1, wherein said media port further comprises a port and a packet lane connected to said docking station and wherein said step of forwarding said data to a high speed docking station comprises forwarding data through the packet lane to the docking station.

3. A method of handling data as recited in claim 2, wherein said packet lane comprises a point to point bus providing a direct connection between said port and said high speed docking station.

4. A method of handling data as recited in claim 2, wherein said packet lane comprises a portion of a shared bus, wherein a shared bus protocol mediates the flow of data between said port and said high speed docking station.

5. A method of handling data as recited in claim 1, wherein the step of forwarding said data to another media port comprises forwarding said data to a second high speed docking station communicating with said another media port.

6. A method of handling data as recited in claim 5, wherein the second high speed docking station is connected to a second master and the another media port communicates with a third high speed docking station connected to the second master and said forwarding occurs between the first master, the second high speed docking station, the second master and the third high speed docking station.

7. A method of handling data as recited in claim 1, wherein said step of receiving an incoming data at a media port comprises receiving data according to IEEE 802.3 specifications.

8. A method of handling data as recited in claim 1, wherein said step of receiving an incoming data at a media port comprises receiving data according to IEEE 802.11 specifications.

9. A method of handling data as recited in claim 1, wherein said step of receiving an incoming data at a media port comprises receiving data according to a wireless communication specification which supports data, voice and content-centric applications.

10. A method of handling data as recited in claim 1, wherein said step of receiving an incoming data at a media port comprises receiving data according to IEEE 1394 specifications.

11. A method of handling data as recited in claim 1, wherein said step of receiving an incoming data at a media port comprises receiving data according to communications specifications for cable modems.

12. A method of handling data as recited in claim 1, wherein said step of receiving an incoming data at a media port comprises receiving data according to Synchronous Optical Network specifications.

13. A method of handling data as recited in claim 1, wherein said step of receiving an incoming data at a media port comprises receiving data according to specifications for a switched based serial I/O interconnect architecture built for fault tolerance and scalability.

* * * * *